US007870072B1

(12) United States Patent
Dennes et al.

(10) Patent No.: US 7,870,072 B1
(45) Date of Patent: Jan. 11, 2011

(54) SYSTEMS AND METHODS FOR PROVIDING MULTIPLE ENTITIES WITH ACCESS TO ACCOUNT INFORMATION

(75) Inventors: Jeff Dennes, San Antonio, TX (US); Charles R. Bear, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/854,858

(22) Filed: Sep. 13, 2007

(51) Int. Cl.
*G06Q 40/00* (2006.01)
(52) U.S. Cl. .............................. 705/40; 705/42; 705/44
(58) Field of Classification Search .................... 705/1, 705/34–40; 235/380
See application file for complete search history.

(56) References Cited

U.S. PATENT DOCUMENTS

| 7,050,996 | B1 | 5/2006 | Blagg et al. | |
|---|---|---|---|---|
| 7,213,064 | B2 | 5/2007 | Smith et al. | |
| 2003/0097331 | A1* | 5/2003 | Cohen | 705/39 |
| 2004/0015438 | A1 | 1/2004 | Compiano et al. | |
| 2004/0098337 | A1 | 5/2004 | Gudgeon et al. | |
| 2004/0170261 | A1 | 9/2004 | Baker | |
| 2004/0254881 | A1* | 12/2004 | Kumar et al. | 705/40 |
| 2005/0080691 | A1* | 4/2005 | Holm-Blagg | 705/30 |
| 2005/0086163 | A1 | 4/2005 | Johnson et al. | |
| 2006/0212393 | A1 | 9/2006 | Lindsay Brown | |
| 2007/0040015 | A1 | 2/2007 | Carlson et al. | |

OTHER PUBLICATIONS

Automated Clearing House—Wikipedia, the free encyclopedia. Jul. 5, 2006 [online] Retrieved on Oct. 10, 2008 <http://web.archive.org/web/20060705091544/http://en.wikipedia.org/wiki/Automated_Clearing_House. Jul. 5, 2006>.*
"Multiple Users? You're Still in Control!" by CB Media Limited: Secton Advertising Supplement; Guide to Electronic Cash Management: vol. 119 No. 4; p. 10-1 page: copyright 2000 CB Media Limited.*
Schulman, Richard W. and Faierman-Schulman, Claudia A.; "Elder Financial Abuse: A Review for Primary Car Physicians"; The Canadian Alzheimer Disease Review; Sep. 2000; pp. 8-11.

(Continued)

*Primary Examiner*—F. Ryan Zeender
*Assistant Examiner*—Hajime Rojas
(74) *Attorney, Agent, or Firm*—Brooks, Cameron & Huebsch, PLLC

(57) ABSTRACT

A user may log into a system containing data pertaining to a jointly owned funding account of which he is a co-owner. The user may view information directed to the jointly owned funding account, such as his bills and bills associated with other co-owners. The user may pay bills or schedule payments of bills from the funding account. A co-owner of the funding account may set up an account with a biller and enable other co-owners of the funding account to use this information, thereby providing the other co-owners with the same or similar functionality when they log into the system using their own login information. The information that the co-owner may set up with a biller may be ported over to the information maintained by the system that is directed to the other co-owners.

9 Claims, 6 Drawing Sheets

OTHER PUBLICATIONS

Connerly, Laura; "Helping Others Arrange Their Finances Series: Informal Arrangements"; Family and Consumer Sciences; pp. 1-4; University of Arkansas, Division of Agriculture.

Radecki, Lawrence J. and Wenninger, John; "Paying Electronic Bills Electronically"; Current Issues in Economics and Finance; Jan. 1999; pp. 1-6; vol. 5, No. 1; Federal Reserve Bank of New York.

Grabbe, J. Orlin; "Internet Payment Schemes: Part 1"; Laissez Faire City Times; Feb. 1998; pp. 1-13; http://www.aci.net/kalliste/intpay.htm.

Mantel, Brian; "Why Do Consumers Pay Bills Electronically? An Empirical Analysis"; Economic Perspectives; 2000; pp. 32-48; Issue Q IV; Federal Reserve Bank of Chicago.

* cited by examiner

SYSTEMS AND METHODS FOR PROVIDING MULTIPLE ENTITIES WITH ACCESS TO ACCOUNT INFORMATION

CROSS-REFERENCE TO RELATED APPLICATIONS

This application is related by subject matter to that disclosed in the following commonly assigned applications, the entirety of which are hereby incorporated by reference herein: U.S. patent application Ser. No. 11/854,819, and U.S. patent application Ser. No. 11/854,932, each filed on Sep. 13, 2007 and each entitled "Systems And Methods For Providing Multiple Entities With Access To Account Information."

BACKGROUND

Joint funding account owners who wish to pay bills online, via the Internet or another network, from the funding account must either individually register the account with a biller, or must share login access to the account. If each joint funding account owner registers the account with the biller, this results in additional work and data entry for the account owners, and leads to an increased likelihood of data entry error and security compromise. If joint funding account owners share login access to an account, then one of the account owners legitimately registers the account, and must share his access information, such as username and password, with other account owner(s). However, an account owner may not wish to share his access information with other account owner (s), and may at some point, change his access information, thereby denying the other owner(s) access to the joint funding account.

In some situations, a funding account may be registered to a single owner, but that single owner may desire or require oversight (e.g., a child, a businessperson, an elderly person). The funding account is not accessible to another person, such as a parent, business colleague, or caretaker, unless that person logs in to the account using the owner's access information. This increases the likelihood of a security compromise, and also requires cooperation by the funding account owner. If the owner changes his access information, such as his username or password, the person who is monitoring the funding account for the owner may be denied access to the funding account.

SUMMARY

An entity, such as a user, may log into a system associated with a financial services institution or other entity, via the Internet or other network for example, using a computing device. The system may contain data or other information pertaining to a jointly owned funding account of which he is a co-owner. The user may view information directed to the jointly owned funding account, such as his bills and bills associated with other co-owners. The user may pay bills or schedule payments of bills from the funding account.

A co-owner of a jointly owned funding account may set up an account with a biller and enable other co-owners of the jointly owned funding account to use this information, thereby providing the other co-owners with the same or similar functionality when they log into the system using their own login information. The information that the co-owner may set up with a biller may be ported over to the information maintained by the system that is directed to the other co-owners. In this manner, the other co-owners do not have to register with the biller, but may still receive bills and access the biller information using their own login information to the jointly owned funding account.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

In an implementation, an entity, such as a user, may log into a system, via the Internet or other network for example, using a computing device. The system may be associated with a financial services institution or other company or entity, and may contain data or other information pertaining to a jointly owned funding account (also referred to herein as a joint funding account) of which he is a co-owner. The user may view information directed to the jointly owned funding account. The user may view his bills, as well as bills associated with other co-owners (e.g., a spouse, a child, a business partner, etc.). The user may pay any of the bills from the funding account. A joint funding account may be an account in which users have joint tenant access to the funding account.

In an implementation, a co-owner of a joint funding account may set up an account with a biller and enable other co-owners of the joint funding account to use the information, thereby providing the other co-owners with the same or similar functionality when they log into the system having the joint funding account using their own login information. The information that the co-owner set up with a biller may be ported over to the information maintained by the system that is directed to the other co-owners. In this manner, the other co-owners do not have to register with the biller, but may still receive their (and perhaps others') bills and access the biller information using their own login information to the joint account. In an implementation, users on the same joint funding account may share biller information, as well as information pertaining to scheduled payments and completed payments.

Figure 1:
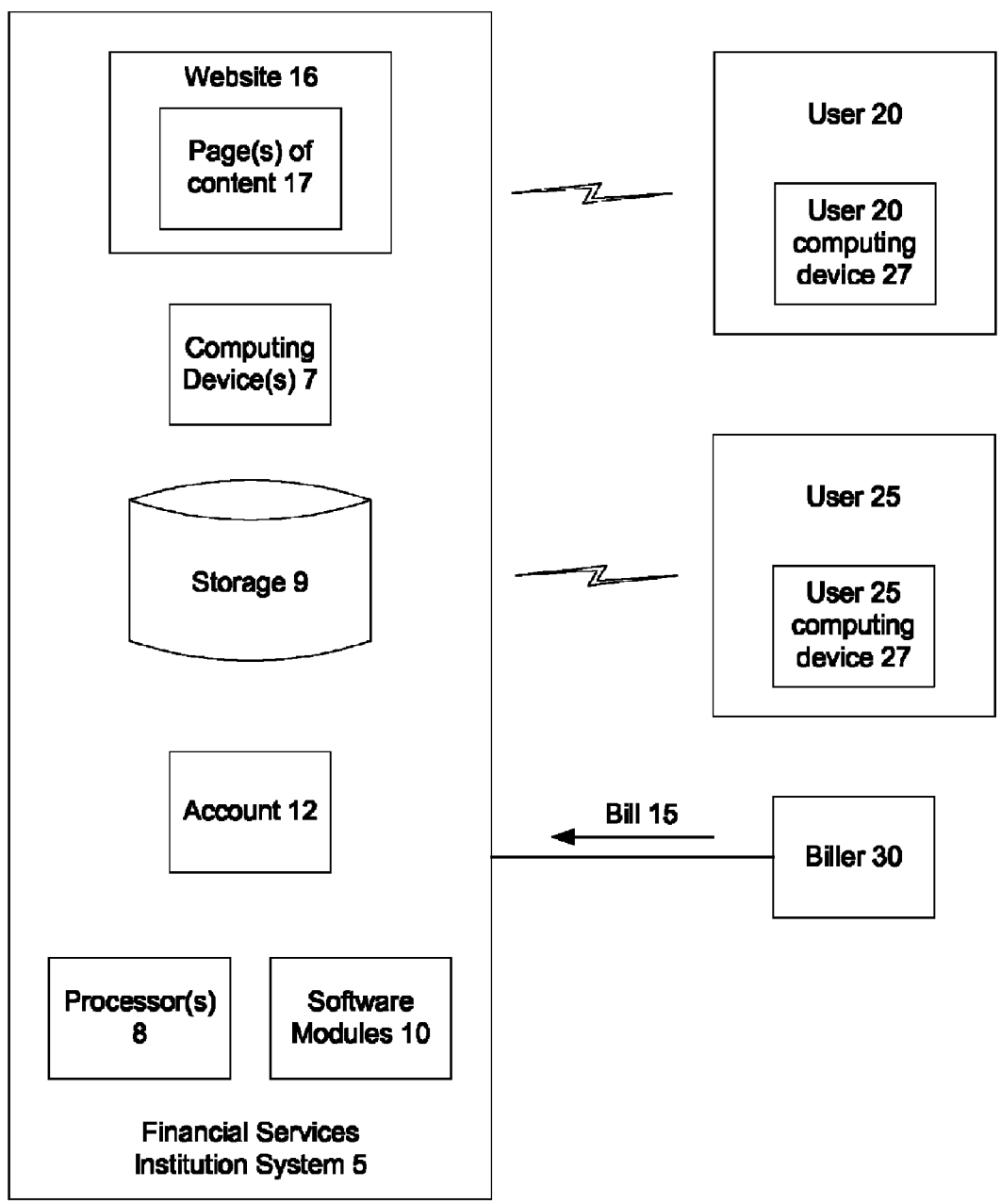
FIG. 1 is a block diagram of an implementation of a system that may be used to provide multiple entities with access to account information.

FIG. 1 is a block diagram of an implementation of a system that may be used to provide multiple entities with access to account information. In an implementation, a financial services institution system 5 maintains accounts associated with entities, such as customers, also referred to herein as users. FIG. 1 shows an account 12 that is jointly owned by two users 20, 25, although the financial services institution likely may maintain many accounts owned jointly or individually by many users.

The account 12 may be a funding account, such as a checking account, money market mutual fund account, or other account associated with a funding source. In an implementation, the two users 20, 25 may share access to the account 12 and may each have signature authority on the account 12. The users 20, 25 may include any entities, such as family members, including spouses, siblings, parents and children, or other relatives, or may be less formally related, and may include friends, colleagues, classmates, partners, guardians, and caretakers, for example.

The users 20, 25 may access the financial services institution system 5, or a website 16 associated with the financial services institution system 5, for example, via an associated user computing device 27. The users 20, 25 may identify themselves and authenticate themselves to the financial services institution system 5 using any known techniques. An example user computing device 27 is described with respect to FIG. 6.

One or more of the users 20, 25 may have an account or other relationship with one or more billers. One biller 30 is shown in FIG. 1, although it is contemplated that multiple billers may have relationships with one or more users. A biller 30 may be a credit card company, a utility company, a financial services institution that is different from or the same as the financial services institution system 5, or any entity or vendor that a user has an account with or that may be owed money by a user.

The biller 30 may provide a bill 15, associated with one of the users 20, 25, to the financial services institution system 5. The bill 15 may then be presented on one or more pages of content 17 that are provided to one of the users 20, 25 when he logs onto a website 16 associated with the financial services institution system 5. The user may authenticate himself to the financial services institution system 5, via the website 16 using any known authentication technique, and may receive the page(s) of content 17 on a display device associated with the user computing device 27. The page(s) of content 17 may display information associated with the account 12 along with the bill 15, and which user is associated with or received the bill 15. The bills that may be received, displayed, and/or paid may be associated with or generated by the financial services institution that maintains the joint funding account, or may be a third party biller.

A user's information, and information related to another user, may be retrieved and displayed, e.g., on the same or on individual pages of content. So, in an implementation, there may a user's page, and his spouse's page. The user may then access his spouse's page by logging into the system to access the joint funding account, and may review and/or pay his spouse's bills.

The financial services institution system 5 may also comprise a computing device 7. A user 20, 25 may use their associated user computing device 27 to interact with the computing device 7. The computing device 7 may have one or more processors 8, storage 9 (e.g., storage devices, memory, etc.), and software modules 10. The computing device 7, including its processor(s) 8, storage 9, and software modules 10, may be used in the performance of the techniques and operations described herein. Information associated with the account 12 may be stored in storage 9 or other storage, for example.

Example software modules may include modules for receiving a bill from a biller and associating it with an account, identifying and authenticating a user, generating web page content for display, and receiving payment instructions from a user, described further herein. While specific functionality is described herein as occurring with respect to specific modules, the functionality may likewise be performed by more, fewer, or other modules. The functionality may be distributed among more than one module. An example computing device and its components are described in more detail with respect to FIG. 6.

Figure 2:
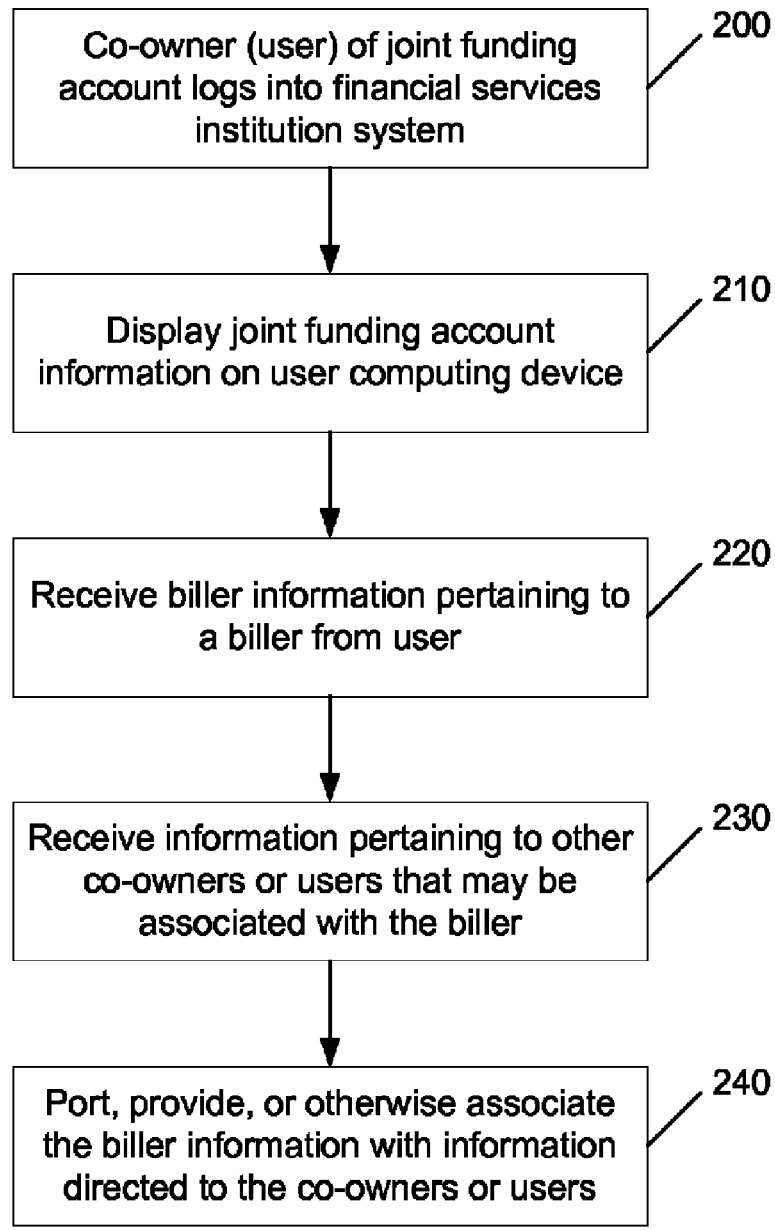
FIG. 2 is an operational flow of an implementation of a method of providing multiple entities with access to account information.

FIG. 2 is an operational flow of an implementation of a method of providing multiple entities with access to account information. At operation 200, an entity, such as a user who may be one of the co-owners of a joint funding account, logs onto a website or other computing system associated with a financial services institution, via the Internet or another network, for example. The user may log in via a user interface, and may provide identification information, authentication information, or other user access information in order to access the account information, displayed on the user computing device as a page of content, at operation 210.

The user may provide biller information to the account, such as the name of a utility company and his account number, or the name of a credit card and his account number, and this information may be received, processed, and/or stored by the financial services institution system at operation 220. This may allow the financial services institution system to link to or otherwise access or receive a bill from the biller. The user may provide the biller information via a user interface in conjunction with a page of content or other feature of the website, for example.

The user may provide information pertaining to another entity, such as one or more other users associated with the account (e.g., co-owners) that may be associated with the biller, and this information may be received, processed, and/or stored by the financial services institution system at operation 230. The information may comprise the other user's name(s), identifier(s), or account number(s), for example. The user may provide information pertaining to some users or co-owners of the joint funding account and not provide information pertaining to other users or co-owners. The user may provide this information via a user interface in conjunction with the page of content or other feature of the website, for example.

At operation 240, the financial services institution system ports, provides, or otherwise associates the information pertaining to the biller to co-owners identified by the user. In an implementation, the biller information may be integrated into information maintained by the financial services institution system that is directed to the co-owners.

It is contemplated that the user may provide biller information to be associated with additional users, while retaining some other biller information just for his access and which may not be ported, provided, or otherwise associated with other co-owners of the joint funding account. In fact, these other co-owners may not be aware of such biller information.

Thus, in an implementation, the user who established the biller information, or a co-owner who has the biller information ported over to his account, may log into the financial services institution system and, via a website, one or more pages of content, and a user computing device, see the co-owned funding account information as well as any bills that may be provided by a biller, regardless of which co-owner or user the bills are associated with. The bills may be shown on the same page of content or separate pages of content, such as bills associated with each user being displayed on separate pages of content.

Thus, in an implementation, two users may have a joint account with a biller, such as a credit card company, as well as a jointly owned funding account. The individual credit cards issued to each user may have the same credit card number or different numbers. One of the users may log into the financial services institution's website, access the jointly owned funding account, and provide the credit card joint account information, along with the other user's name or other identification information, to the financial services institution system. The credit card joint account information may then be associated with the other user. So when the other user logs in to access the jointly owned funding account, he may see the information associated with the credit card company. He may then receive, view, and pay bills from the credit card company using the jointly owned funding account.

In an implementation, two users who co-own a funding account may each have separate accounts with a biller, such as a credit card company. One of the users may access the jointly owned funding account, and provide the credit card account information for the other user. This information may then be associated with the other user by the financial services institution system. Both users may be able to view and/or pay the credit card bill associated with the other user using the jointly owned funding account. Each entity may have different signature authority.

Figure 3:
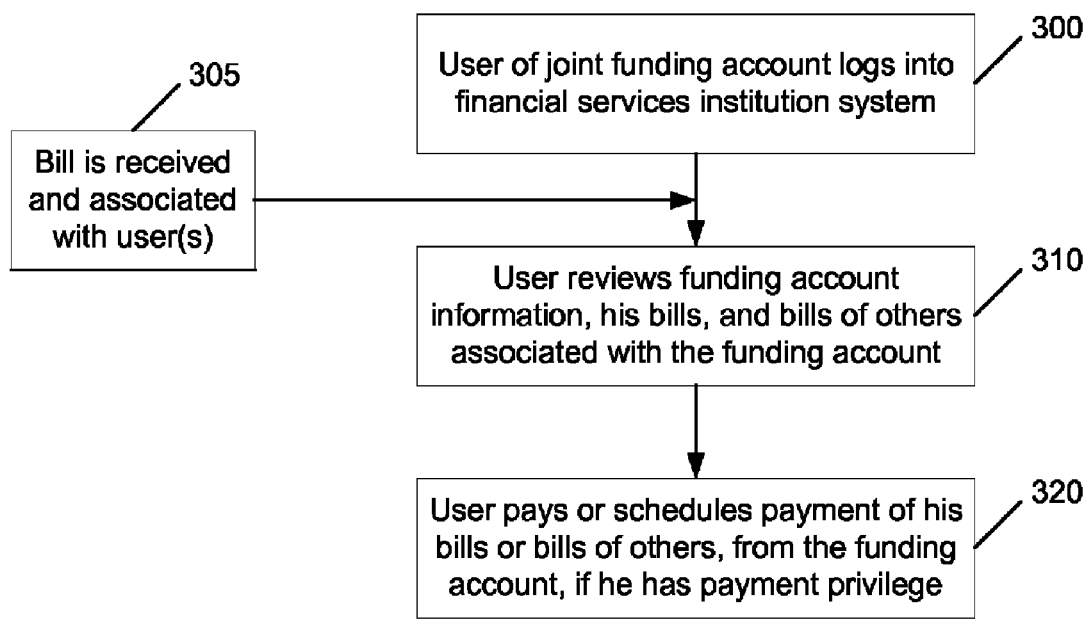
FIG. 3 is an operational flow of an implementation of a method of bill presentation after providing multiple entities with access to account information.

FIG. 3 is an operational flow of an implementation of a method of bill presentation after providing multiple entities with access to account information, as in an implementation described with respect to FIG. 2. At operation 300, an entity, such as a user, logs into the financial services institution system, via a website or other interface, for example. The user may be any co-owner of the jointly owned funding account, and may have set up biller information and had it ported over to other entities or users, or may have received biller information via one of the other users providing it to the financial services institution system.

At some point, at operation 305, before or after the user logs into the financial services institution system, a bill may be received at the financial services institution system from a biller. The bill may be associated with the appropriate user, as well as the other users associated with the jointly owned funding account that has been granted access to such a bill.

At operation 310, the user may review the funding account information, bills associated with the user, and bills associated with other users. This information relating to accounts and bills may be provided to the user via one or more pages of content on a website associated with the financial services institution. At operation 320, the user may pay, or schedule payment of, one or more of his bills and/or one or more of the bills associated with other users. Payment may be made from the jointly owned funding account.

In an implementation, the user may not be permitted to pay bills associated with other users; the user may only pay bills that he has received and be blocked from paying the bills of other users. Such denial of payment privilege may be implemented by the other user or users.

In an implementation associated with delegated authority, one of the users may be a primary account owner, and one or more other users may be secondary account owners. The account privileges associated with a primary account owner may differ from the account privileges associated with a secondary account owner. One of the owners, such as the secondary account owner, may have delegated authority to the primary account owner.

Figure 4:
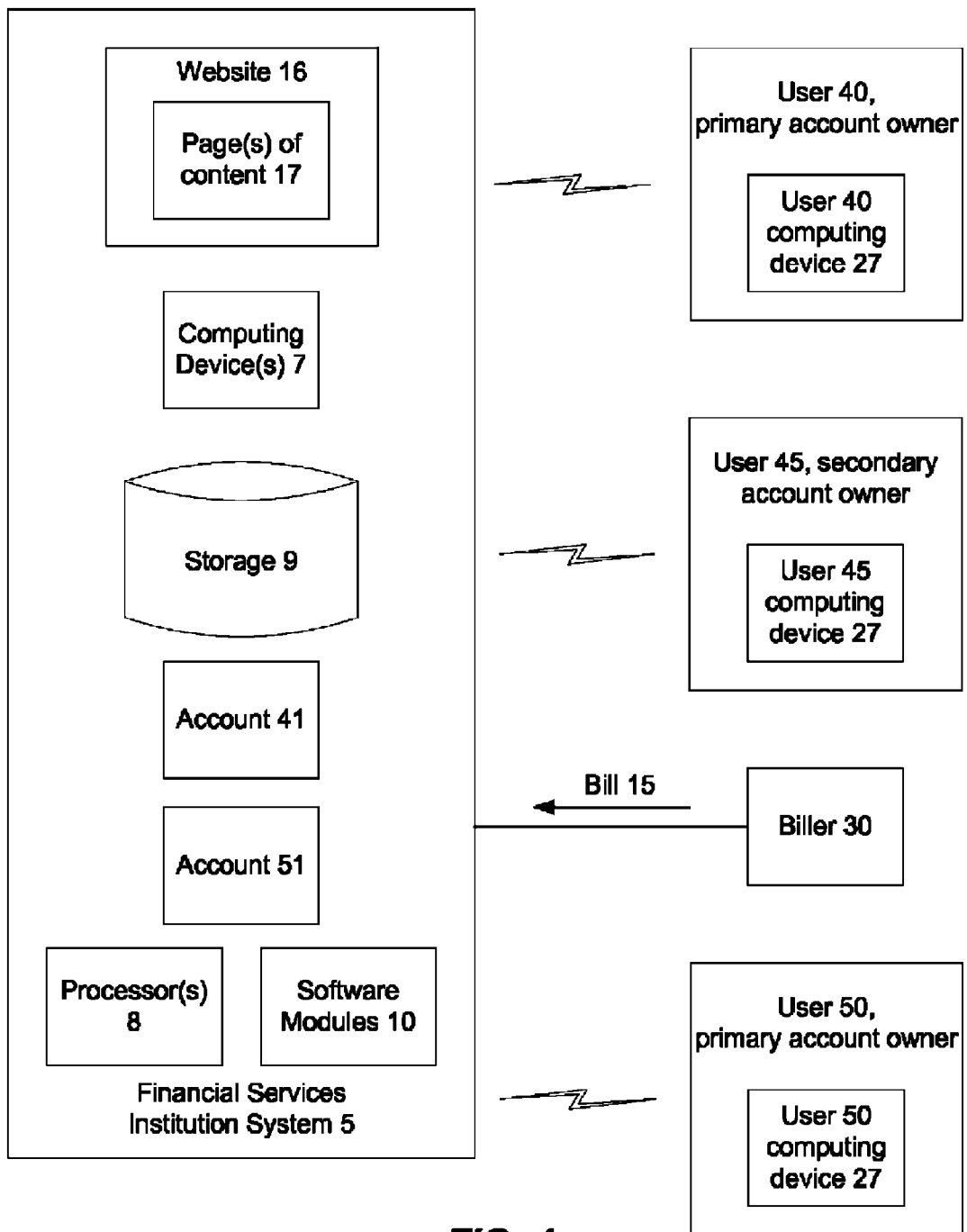
FIG. 4 is a block diagram of another implementation of a system that may be used to provide multiple entities with access to account information.

FIG. 4 is a block diagram of another implementation of a system that may be used to provide multiple entities with access to account information. The implementation shown in FIG. 4 is similar to that shown FIG. 1 and may have elements or components that are similar. These similar elements or components are labeled identically and their descriptions are omitted for brevity.

FIG. 4 shows two entities, users 40, 45, who may access the financial services institution system, similar to that described above with respect to users 20, 25. However, one of the users, e.g., user 40, may be a primary account owner of a funding account 41, and one of the users, e.g., user 45, may be a secondary account owner of the funding account 41. The primary account owner, user 40, may view bills received for him as well as bills received for the secondary account owner, user 45. The user 40 may also pay any of the bills from the funding account 41. The access privileges may be set such that the secondary account owner, user 45, may only view his bills, and may not view or even be aware of any bills received for the primary account owner.

In an implementation, a parent acting as a primary account owner, may view a child's bills (e.g., the child is in college and is a secondary account owner), and pay the child's bills directed to tuition and housing, for example. The child may or may not be able to pay his bills, depending on the privileges established by the parent acting as the primary account owner. Similarly, the child may or may not be able to view the parent's bills, based on the established privileges. The privileges may be set by the parent via a website associated with the financial services institution that maintains the funding account.

In an implementation, a parent may give his child a credit card in the child's name. Thus, the child may buy things and a bill may be generated and shown on a page of content pertaining to the joint funding account. The parent may monitor the card activity and pay the bill from the joint funding account. But the child may only view and pay his bills, and may not be aware of the parent's other bills or even other activity on the credit card, if the parent shares the credit card account with the child.

In an implementation, the secondary account owner may only view his bills, but cannot pay the bills. Only the primary account owner may pay the bills, whether they have been received by the primary account owner or a secondary account owner. In another implementation, the primary account owner may only view bills received by a secondary account owner, but may not pay those bills, such as in the case of a caretaker or business owner, when the caretaker or business owner is the primary account owner who oversees the expenditures, but does not participate in the payment of the bills.

Although only one secondary account owner is shown in FIG. 4, any number of secondary account owners may be associated with a funding account, just as any number of primary account owners may be associated with a funding account, in some implementations.

Another entity, user 50, is shown in FIG. 4. User 50 may be a primary account owner of another funding account 51, unrelated to the funding account 41 which has user 40 as a primary account holder. User 50 may have similar privileges or different privileges on his funding account 51 as described above with respect to the privileges of user 40. In an implementation, a secondary account owner, such as user 45, may be a secondary account owner, with associated privileges, on various funding accounts, such as the funding account 41 on which user 40 is a primary account owner, and the funding account 51 on which user 50 is a primary account owner. It is also contemplated that a user may be a primary account owner on one or more funding accounts, and a secondary account owner on one or more other funding accounts. For example, the primary account owner 40 may a primary account owner on the funding account 41 and a secondary account owner on the funding account 51, so may have different privileges and accessibility on the accounts 41, 51.

In an implementation, a secondary account owner may be permitted access to view or pay some or all of the bills associated with a primary account owner. A primary account owner may grant such full or partial access, by changing the privileges associated with the funding account. The privileges may be changed for a limited duration or may stay in effect until canceled or otherwise changed or revoked. Such changes may be made via the financial services institution's website, in an implementation.

As an example, a secondary account owner may be a caretaker who may be given access to the account and bills of a person (the primary account owner) the caretaker is caring for. Another example of a secondary account owner is a business person who may be given access to the account and bills being handled by another person affiliated with the business who is designated as the primary account owner. These secondary account owners may have access to view the bills associated with the primary owner of the account, and may or may not have authority to pay the bills from the funding account.

Figure 5:
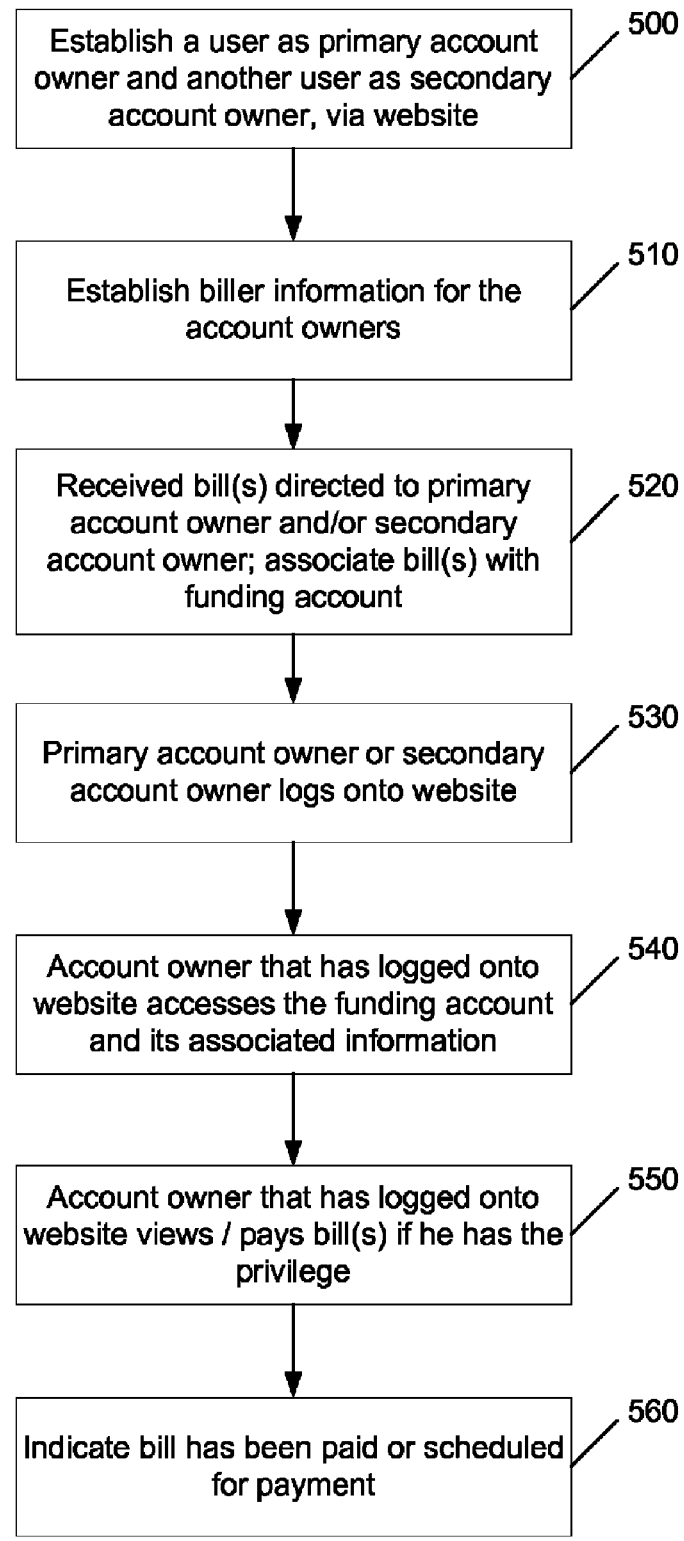
FIG. 5 is an operational flow of an implementation of another method of providing multiple entities with access to account information, and subsequent bill viewing and payment.

FIG. 5 is an operational flow of an implementation of another method of providing multiple entities with access to account information, and subsequent bill viewing and payment. At operation 500, an entity or a user is established as a primary account owner, and another entity or user is established as a secondary account owner. This may be set up by the account owners jointly or individually logging onto the financial services institution's website or otherwise contacting the financial services institution, for example. The account may be a funding account, such as those described above.

At operation 510, biller information is established for the users. Biller information may be provided by the primary account owner and then associated with the secondary account owner, using techniques described herein, such as those described above with respect to FIG. 2, for example. Biller information may also be provided by the secondary account owner, in an implementation.

At some point, at operation 520, one or more bills are received at the financial services institution system directed to the primary account owner and/or the secondary account owner, and are associated with the funding account. At operation 530, the primary account owner or the secondary account owner may log onto the website, and at operation 540, may access the funding account and its associated information.

Depending on the implementation, various privileges may be provided to the account owner who has logged in, such as the ability to view and/or pay some or all bills, regardless of which account owner the bills are associated with. The account owner may then act in accordance with his privileges, at operation 550, by viewing and/or paying bills, for example.

After a bill has been paid or scheduled for payment, it may be indicated that payment instructions have been received or indicated as paid or scheduled for payment, for example, by highlighting or by displaying an icon or other notation or indicator, at operation 560. In this manner, any account owner who subsequently accesses the funding account and its information may view the bill and see that it has already been paid or has been scheduled for payment. The bills and associated information, for the various account owners, may be presented on one or more pages of content, either combined or separated by account owner, depending on the implementation.

In an implementation, each co-owner or user of a joint funding account may be a member of an organization, such as an organization associated with a financial services institution. A non-member of the organization may not have access to a joint funding account. Accordingly, delegation, as described herein, may only be given to another member.

Although some of the implementations described herein describe two entities or users sharing a joint account, the implementations are not limited to two entities or users, and it is contemplated that any number of entities or users may share a joint account in accordance with the subject matter disclosed herein.

Exemplary Computing Arrangement

Figure 6:
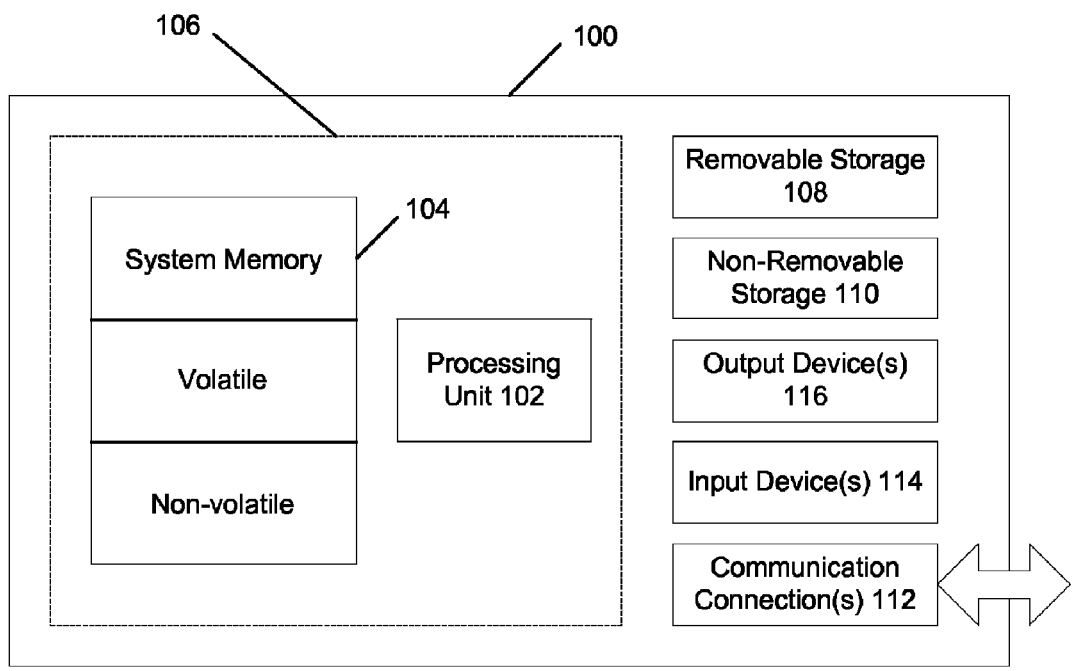
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 6 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. System memory 104, removable storage 108, and non-removable storage 110 are all examples of computer storage media. Computer storage media includes, but are not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of bill presentation, comprising:

receiving, by a computing device of a financial services institution system, biller information pertaining to a biller from a first entity;

associating the biller information with the first entity and a second entity by the computing device of the financial services institution system, the first entity and the second entity being co-owners of a jointly owned funding account;

receiving a bill, at the computing device of the financial services institution system, for the first entity from the biller;

receiving a bill, at the computing device of the financial services institution system, for the second entity from the biller;

associating the bill for the first entity with the first entity by the computing device of the financial services institution system;

associating the bill for the second entity with the first entity by the computing device of the financial services institution system;

associating the bill for the second entity with the second entity by the computing device of the financial services institution system;

providing the bill for the first entity and the bill for the second entity to the first entity, by the computing device of the financial services institution system, for viewing via a page of content accessible via login information of the first entity, the first entity having a privilege to pay the bill for the first entity from the jointly owned funding account and to view the bill for the second entity, and without a privilege to pay the bill for the second entity from the jointly owned funding account via the page of content; and providing the bill for the second entity to the second entity, by the computing device of the financial services institution system, for viewing via the page of content accessible via login information of the second entity, only the second entity having the privilege to pay the second entity bill from the jointly owned funding account via the page of content.

2. The method of claim 1, wherein the jointly owned funding account is maintained by a financial services institution unrelated to the biller.

3. The method of claim 1, further comprising denying the first entity from paying the bill associated with the second entity.

4. A computer-readable medium comprising computer-readable instructions for bill presentation, said computer-readable instructions comprising instructions that when executed cause a processor to:
   receive biller information pertaining to a biller from a first entity;
   associate the biller information with the first entity and a second entity, the first entity and the second entity being co-owners of a jointly owned funding account;
   receive a bill for the first entity from the biller;
   receive a bill for the second entity from the biller;
   associate the bill for the first entity with the first entity;
   associate the bill for the second entity with the first entity;
   associate the bill for the second entity with the second entity;
   provide the bill for the first entity and the bill for the second entity to the first entity for viewing via a page of content accessible via login information of the first entity, the first entity having a privilege to pay the bill for the first entity from the jointly owned funding account and to view the bill for the second entity, and without a privilege to pay the bill for the second entity from the jointly owned funding account via the page of content; and
   provide the bill for the second entity to the second entity for viewing via the page of content accessible via login information of the second entity, only the second entity having the privilege to pay the second entity bill from the jointly owned funding account via the page of content.

5. The computer-readable medium of claim 4, wherein the jointly owned funding account is maintained by a financial services institution unrelated to the biller.

6. The computer-readable medium of claim 4, further comprising instructions that deny the first entity from paying the bill associated with the second entity.

7. A system for bill presentation, comprising:
   at least one computing device;
   at least one subsystem that receives biller information pertaining to a biller from a first entity;
   at least one subsystem that associates the biller information with the first entity and a second entity, the first entity and the second entity being co-owners of a jointly owned funding account;
   at least one subsystem that receives a bill for the first entity from the biller;
   at least one subsystem that receives a bill for the second entity from the biller;
   at least one subsystem that associates the bill for the first entity with the first entity;
   at least one subsystem that associates the bill for the second entity with the first entity;
   at least one subsystem that associates the bill for the second entity with the second entity;
   at least one subsystem that provides the bill for the first entity and the bill for the second entity to the first entity for viewing via a page of content accessible via login information of the first entity, the first entity having a privilege to pay the bill for the first entity from the jointly owned funding account, and to view the bill for the second entity, and without a privilege to pay the bill for the second entity from the jointly owned funding account via the page of content; and
   at least one subsystem that provides the bill for the second entity to the second entity for viewing via the page of content accessible via login information of the second entity, only the second entity having the privilege to pay the second entity bill from the jointly owned funding account via the page of content.

8. The system of claim 7, wherein the jointly owned funding account is maintained by a financial services institution unrelated to the biller.

9. The system of claim 7, further comprising at least one subsystem that denies the first entity from paying the bill associated with the second entity.

* * * * *